Feb. 18, 1969

M. R. STALEY 3,427,953

APPARATUS FOR PREPARING CORNMEAL COLLETS FOR FOOD

Filed Sept. 25, 1967

INVENTOR.
MELVIN R. STALEY
BY John R. Walker, III
Attorney

United States Patent Office 3,427,953
Patented Feb. 18, 1969

3,427,953
APPARATUS FOR PREPARING CORNMEAL COLLETS FOR FOOD
Melvin R. Staley, Paducah, Ky., assignor to Jif-Chips Snak Foods, Inc., Paducah, Ky., a corporation of Kentucky
Filed Sept. 25, 1967, Ser. No. 670,323
U.S. Cl. 99—237      5 Claims
Int. Cl. A23l 1/10

ABSTRACT OF THE DISCLOSURE

Cabinet-mounted apparatus including an oven for baking cornmeal collets; revolving, tiltable kettle means for agitating and coating the baked collets with melted cheese and oil; receptacle means for receiving the coated baked collets; tray means including a sliding closure covered opening in the bottom wall of the tray means; and guide means for guidingly positioning the tray means over the kettle with the outlet opening of the tray means being arranged over the mouth of the kettle. The tray means of the apparatus being adapted to be filled with uncooked collets and placed in the oven for baking the collets and adapted for use in transferring the baked collets from the oven to the kettle.

BACKGROUND OF THE INVENTION

Field of the invention

Apparatus relating to popcorn poppers, peanut roasters, snack bars and other such means for preparing and vending food for the public.

The invention particularly concerns the preparation and vending of uncooked collets made of cornmeal. A collet, as is well-known to those in the art, is a small kernel-like piece of uncooked cornmeal which has been formed into a desired shape and is ready for baking and coating with cheese and oil.

Description of the prior art

Previously, the collets were baked, coated and packaged in a potato chip or snack-food factory and sold as corn curls, corn chips or under various trade names. The machinery used for processing the collets are heavy duty industrial type machines adapted for processing large quantities of collets substantially in a continuous manner. The processed collets are plastic-film-packaged in individual snack packs and distributed through drive-in groceries, food markets and by vending machines. A problem with such merchandising is that the prepared and packaged collets stay fresh for only a relatively short time. The stale collets are often picked up by the distributor and reprocessed into animal food or the like, which results in inefficiency and waste. Also, stale merchandise, of course, causes dissatisfied customers.

SUMMARY OF THE INVENTION

The present invention provides a compact stand for processing cornmeal collets in relatively small quantities at the point of sales. The operator of the stand may bake and coat with cheese and oil only small batches of collets, thereby assuring a fresh product. Since the collets may be processed at a rate according to the quantity of collets sold, there is only a small amount of waste. Uncooked collets may be stored for a much longer time than processed collets and may be entirely fresh-tasting when processed. The collets are prepared in view of the public which stimulates appetites and causes increased sale of the product.

DESCRIPTION OF THE PREFERRED EMBODIMENT

Figure 1:
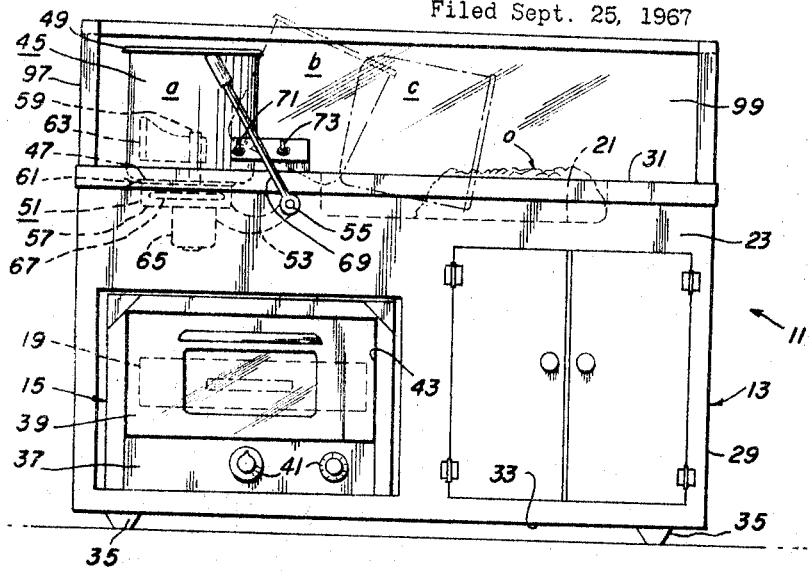
FIG. 1 is a front elevational view of the collet processing stand of the present invention.
Figure 2:
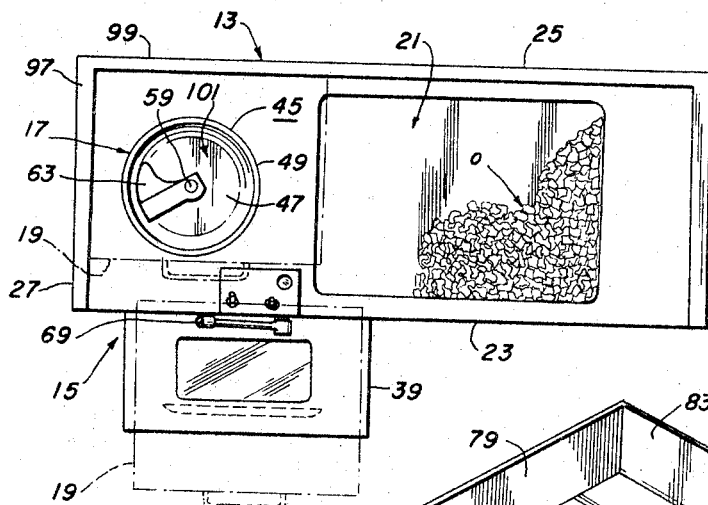
FIG. 2 is a top view taken as from FIG. 1.
Figure 3:
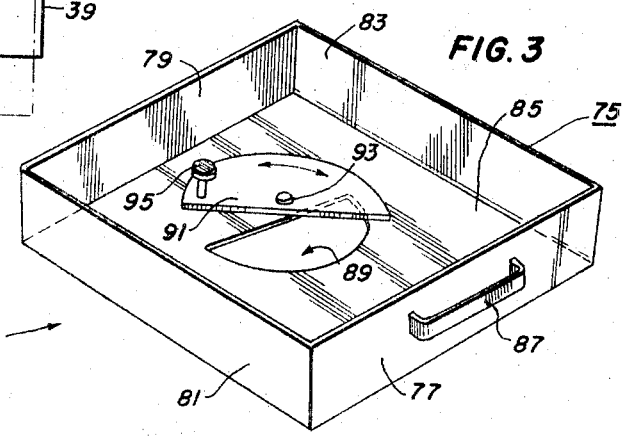
FIG. 3 is a perspective view of the tray means of the invention.

The collet-processing stand is indicated by numeral 11 and includes a cabinet 13; an oven 15; kettle means 17 for agitating and coating collets (indicated 0); tray means 19 for containing collets 0 in oven 15 and transferring the collets from the oven to kettle means 17; and receptacle means 21 for receiving and holding the processed collets.

Cabinet 13 is rectangular and includes respectively front and back walls 23, 25; left and right end walls 27, 29; and top and bottom walls 31, 33. Legs 35 support cabinet 13.

Oven 15 includes a space-enclosing body 37 and a downwardly opening door 39 pivotally secured along the lower portion thereof to body 37. Oven 15 is preferably an electric type and includes control knobs 41. Oven 15 is recess-mounted snugly in opening 43 in front wall 23 of cabinet 13.

Kettle means 17 includes a bowl-like kettle 45 having a bottom wall portion 47 and a rim portion 49 extending around the mouth portion of kettle 45. A base 51, arm 53, and shaft means 55 provide support means for kettle 45. Base 51 includes a generally flat circular major portion 57 and a post portion 59 concentrically fixed on and projecting outwardly from major portion 57. Suitable bearing means 61 rotatingly mount kettle 45 from base 51 with post 59 projecting coaxially in the interior of the kettle. A mixing paddle 63 fixed on and extending radially from post 59 provides stationary collet-agitating paddle means in rotatable kettle 45. An electric motor 65 is secured on base 51 and through suitable gearing (not shown) rotatingly drives kettle 45 about paddle 63. An annular electric heating element 67 concentrically fitted in base 51 provides means for heating bottom wall portion 47 of kettle 45. Arm 53 rigidly interconnects kettle base 51 and shaft 55 and provides radially offset mounting means for the kettle.

Kettle 45 is adapted to be pivotally moved to first, second and third positions indicated respectively a, b and c (see FIG. 1). Kettle 45 is vertically arranged in position a and in such position is adapted to receive the baked collets. Position b is the mixing position, and when kettle 45 is arranged obliquely in this position collets 0 are adapted to be coated with the mixture of cheese and oil. Position c is the position of kettle 45 for dumping the processed collets 0 into receptacle 21. A lever 69 fixed on the forward terminal portion of shaft 55 is adapted to be manually turned for positioning kettle 45 in the first, second and third positions. A motor switch 71 and heating element switch 73 are provided respectively for selectively rotating or heating kettle 45 in a well-known manner. Motor switch 45 is operable for turning motor 65 on and off and for starting and stopping the rotation of kettle 45. Switch 73 is adapted to be actuated for turning heating element 67 on and off and for heating kettle 45.

Tray means 19 includes a tray body 75 including front and back walls 77, 79; left and right side walls 81, 83 and a bottom wall 85. A handle 87 fixed on front wall 77 provides means for manipulating tray body 75. A semi-circular or crescent-shaped opening 89 is formed centrally in tray body bottom 85. A crescent-shaped gate 91, slightly larger than opening 89, is pivotally secured on the upper surface of bottom 85 by pivot pin 93. The undersurface of gate 91 slidingly engages the upper surface of bottom wall 85; the gate is adapted to be turnably moved to open and close opening 89. A knob-like handle 95 fixed on and projecting vertically from the upper surface of gate 91 is adapted to be manually manipulated for moving gate 91 to and from open and closed dispositions.

The biaxial horizontal proportions of tray body 75 or the width and depth of the body are configured to snugly fit the interior of oven 15. Tray means 19 is selectively adapted to hold collets 0 in oven 15 for baking the collets or for conveying the collets from oven 15 to kettle 45. Tray body 75 is adapted to be placed over the upwardly opening mouth of kettle 45 and by opening gate 91 to cause collets 0 to drop into the interior of kettle 45.

A pair of guide panels including a side panel 97 and a back panel 99 are adapted to engage tray body 75 and correctly position the tray with opening 89 thereof arranged over kettle mouth opening 101. Upstanding side and back panels 97, 99 are right angularly arranged and secured respectively along the left side and back edge surfaces of top wall 31 of cabinet 13. The relative positions of panels 97, 99 and kettle 45, and the relative proportions of tray means 19 is such that tray body outlet opening 89 is arranged directly over kettle mouth opening 101 when tray body 75 is supported on kettle rim 49.

In operating collet processing stand 11, the following procedure may be carried out: A desired quantity of uncooked collets are placed in tray body 75 and the tray placed in oven 15. The collets are baked in the oven for approximately 15 minutes. While the collets are cooking in oven 15, a desired quantity of powdered cheese and oil is placed in kettle 45. The kettle heating element is turned on by switch 73 and the cheese and oil mixture warmed. After the collets have baked sufficiently, tray means 19 is removed and tranferred on top of kettle rim 49. Gate 91 in the bottom of tray body 75 is opened and the hot cooked collets are raked from the tray into the interior of kettle 45. By turnably manipulating kettle lever 69 the kettle is moved to the second or mixing position. Kettle motor 65 is turned on by switch 71 and the kettle caused to rotate about stationary paddle 63. The kettle is rotated for approximately five minutes or until the cheese and oil mixture sufficiently coat the collets. After the cheese and oil mixture has sufficiently coated the collets kettle 45 is stopped from rotating. The kettle is then tilted downwardly to position c and the collets dumped from the kettle into receptacle 21. The processed collets are then ready for packaging and sale.

I claim:
1. Apparatus for use in preparing uncooked kernel-like cornmeal collets for food wherein said collets are baked and then agitated in a mixture of cheese and oil comprising a cabinet having vertical front, back and opposite end walls and horizontal top and bottom structure; an oven recess-mounted in said front wall of said cabinet; means for coating said collets with said mixture of cheese and oil including a cylindrical vertical open-topped kettle adapted to be rotated on its axis, a base including post structure, means rotatingly mounting said kettle on said base structure with said post projecting coaxially from the kettle bottom in the interior of said kettle, paddle structure fixed on said post arranged near the interior bottom surface of said kettle, motor means mounted on said base for rotating said kettle about said paddle thereby agitating said collets, heating element means secured on said base for heating the bottom of said kettle, a horizontal shaft turnably mounted in the upper portion of said cabinet extending fore and aft of said cabinet, arm means rigidly interconnecting said base and said shaft providing radially offset mounting means for said kettle and with said kettle adapted to be positioned either in an upright upwardly opening first position, a second position wherein said kettle is arranged obliquely and upwardly opening in substantially a 45° angle, and a third position wherein said kettle is angled downwardly, lever means secured on said shaft for manually manipulating said kettle selectively to said first, second or third position; tray means adapted to contain a quantity of collets and with said tray means being adapted to be housed in said oven during baking of said collets or adapted to be removed from said oven and supported on the open top of said kettle.

2. The apparatus of claim 1 wherein said tray means includes a body having side and bottom walls, said tray means being provided with an outlet opening formed in said bottom wall and including manually operative sliding closure means arranged over said opening for permitting the collets to be conducted through said opening when said tray is supported over said kettle top; and sink-like receptacle means mounted in the top of said cabinet for receiving the baked and coated collets when said kettle is arranged in said third position.

3. The apparatus of claim 2 wherein said sliding closure means includes a semi-circular gate, pin means pivotally securing said gate on said tray bottom wall for movement over and away from said outlet opening and handle means fixed on and projecting vertically from said gate for manually manipulating said gate to a closed or an open disposition.

4. The apparatus of claim 2 which additionally includes guide means for use in manually positioning said tray on said kettle with said outlet opening of said tray being arranged over said kettle opening.

5. The apparatus of claim 4 wherein said guide means includes two upstanding panels arranged relatively right angularly and means securing said panels on said cabinet in such configuration whereby a side and a back wall of said tray will abuttingly engage said right angularly arranged panels thereby guidingly positioning said tray on said kettle with the outlet opening of said tray being arranged directly over the opening of said kettle.

References Cited

UNITED STATES PATENTS

| 1,112,213 | 9/1914 | Hult et al. | 259—34 |
| 1,302,923 | 5/1919 | Hills | 259—88 |
| 2,092,282 | 9/1937 | Love | 259—88 XR |
| 2,817,331 | 12/1957 | Kaplan. | |
| 3,020,162 | 2/1962 | Cunningham | 99—237 XR |
| 3,095,326 | 6/1963 | Green et al. | 118—19 XR |

FOREIGN PATENTS

| 453,937 | 9/1936 | Great Britain. |

OTHER REFERENCES

German printed application, 1,183,626, printed December 1964.

BILLY J. WILHITE, *Primary Examiner.*

U.S. Cl. X.R.

99—80, 339, 348, 355; 259—88; 118—19